(12) United States Patent
Bissantz

(10) Patent No.: US 11,126,786 B2
(45) Date of Patent: Sep. 21, 2021

(54) METHOD FOR DISPLAYING DATA ON A MOBILE TERMINAL

(71) Applicant: Nicolas Bissantz, Nuremberg (DE)

(72) Inventor: Nicolas Bissantz, Nuremberg (DE)

( * ) Notice: Subject to any disclaimer, the term of this patent is extended or adjusted under 35 U.S.C. 154(b) by 0 days.

(21) Appl. No.: 16/017,179

(22) Filed: Jun. 25, 2018

(65) Prior Publication Data

US 2019/0377776 A1 Dec. 12, 2019

(30) Foreign Application Priority Data

Jun. 7, 2018 (DE) ...................... 10 2018 113 615.3

(51) Int. Cl.
*G06F 40/106* (2020.01)
*G06F 16/26* (2019.01)
*G06F 40/18* (2020.01)
*G06F 3/0484* (2013.01)
*G06F 3/0488* (2013.01)

(52) U.S. Cl.
CPC ............ *G06F 40/106* (2020.01); *G06F 16/26* (2019.01); *G06F 40/18* (2020.01); *G06F 3/04842* (2013.01); *G06F 3/04847* (2013.01); *G06F 3/04883* (2013.01)

(58) Field of Classification Search
CPC ...... G06F 17/212; G06F 17/246; G06F 16/26; G06F 3/04842; G06F 3/04847; G06F 3/04883; G06F 40/106; G06F 40/18
USPC ................................ 715/212, 218, 230, 273
See application file for complete search history.

(56) References Cited

U.S. PATENT DOCUMENTS

| | | | |
|---|---|---|---|
| 6,198,482 B1* | 3/2001 | Okada | G01N 30/8651 702/127 |
| 6,626,959 B1* | 9/2003 | Moise | G06F 40/18 715/210 |
| D757,087 S * | 5/2016 | Hiramatsu | D14/488 |
| 9,412,208 B2* | 8/2016 | Greenberg | G06F 3/04842 |
| 9,430,856 B2* | 8/2016 | Bissantz | G06T 11/203 |
| 9,582,154 B2* | 2/2017 | Greenberg | G06F 3/04842 |
| 9,582,917 B2* | 2/2017 | Greenberg | G06F 16/972 |
| 10,739,947 B2* | 8/2020 | Jisrawi | G06F 3/0488 |
| 11,003,255 B2* | 5/2021 | Wang | G06F 1/1692 |
| 2006/0279541 A1* | 12/2006 | Kim | H04N 21/42222 345/158 |
| 2007/0061757 A1* | 3/2007 | Kobayashi | H04N 21/4622 715/828 |
| 2007/0152981 A1* | 7/2007 | Im | G06F 3/03547 345/173 |
| 2008/0148335 A1* | 6/2008 | Dawson | H04N 21/485 725/132 |
| 2008/0180283 A1* | 7/2008 | Nordenhake | G06F 3/0236 341/22 |
| 2008/0235736 A1* | 9/2008 | Dawson | H04N 21/4622 725/50 |
| 2009/0031350 A1* | 1/2009 | Yabe | H04N 21/47 725/39 |
| 2009/0064222 A1* | 3/2009 | Dawson | H04N 21/4622 725/38 |

(Continued)

*Primary Examiner* — Andrew R Dyer
(74) *Attorney, Agent, or Firm* — Dilworth & Barrese, LLP

(57) ABSTRACT

A method for displaying data on a mobile terminal accesses a database and displays parameters in data fields a first screen view on the touch screen of the mobile terminal, with touching the screen changing to a second screen view displaying different data fields.

17 Claims, 6 Drawing Sheets
(6 of 6 Drawing Sheet(s) Filed in Color)

(56) References Cited

U.S. PATENT DOCUMENTS

| | | | |
|---|---|---|---|
| 2009/0128505 A1* | 5/2009 | Partridge | G06F 3/04883 345/173 |
| 2009/0199241 A1* | 8/2009 | Unger | H04N 21/4532 725/41 |
| 2010/0026790 A1* | 2/2010 | Ohba | G09G 5/006 348/51 |
| 2010/0146283 A1* | 6/2010 | Poitier | G11B 20/0084 713/176 |
| 2010/0180292 A1* | 7/2010 | Epstein | H04N 21/4316 725/32 |
| 2010/0194980 A1* | 8/2010 | Balasubramanian | H04N 21/4126 348/552 |
| 2010/0201618 A1* | 8/2010 | Lorente | G06F 1/169 345/157 |
| 2010/0241996 A1* | 9/2010 | Ho | G06F 3/0482 715/841 |
| 2011/0029609 A1* | 2/2011 | Kavallierou | H04N 1/0044 709/204 |
| 2011/0167387 A1* | 7/2011 | Stallings | G06F 3/04817 715/826 |
| 2011/0283362 A1* | 11/2011 | Hornelf | H04H 20/38 726/26 |
| 2011/0294417 A1* | 12/2011 | Mine | G06F 3/03545 455/41.1 |
| 2012/0057007 A1* | 3/2012 | Ishiguro | A61B 3/032 348/61 |
| 2012/0105611 A1* | 5/2012 | Godar | H04N 13/373 348/54 |
| 2012/0110623 A1* | 5/2012 | Hill | H04N 21/43615 725/53 |
| 2013/0009905 A1* | 1/2013 | Castillo | G06F 3/044 345/174 |
| 2013/0024803 A1* | 1/2013 | Workman | G06F 3/04886 715/781 |
| 2013/0040567 A1* | 2/2013 | Matsubara | G06F 3/041 455/41.1 |
| 2013/0109310 A1* | 5/2013 | Mine | G06F 3/0488 455/41.1 |
| 2013/0326583 A1* | 12/2013 | Freihold | G06F 21/32 726/3 |
| 2013/0342562 A1* | 12/2013 | Shintani | G09G 5/028 345/593 |
| 2014/0022192 A1* | 1/2014 | Hatanaka | H04N 21/42204 345/173 |
| 2014/0184915 A1* | 7/2014 | Terasawa | H04N 5/44543 348/570 |
| 2015/0026590 A1* | 1/2015 | Shirzadi | G06Q 10/107 715/751 |
| 2015/0186003 A1* | 7/2015 | Jong | G06F 3/04847 715/830 |
| 2015/0254874 A1* | 9/2015 | Bissantz | G06T 11/203 345/593 |
| 2016/0065509 A1* | 3/2016 | Yang | G06F 3/04886 715/752 |
| 2016/0065525 A1* | 3/2016 | Dye | G06F 3/0482 715/752 |
| 2016/0253308 A1* | 9/2016 | Olinger | G06F 3/0482 715/215 |
| 2016/0330150 A1* | 11/2016 | Joe | G06F 16/90324 |
| 2016/0371691 A1* | 12/2016 | Kang | G06K 9/00013 |
| 2017/0124053 A1* | 5/2017 | Campbell | G06F 3/04847 |
| 2017/0199862 A1* | 7/2017 | Litt | G06F 17/246 |
| 2017/0206003 A1* | 7/2017 | Paek | G06F 3/04842 |
| 2019/0012305 A1* | 1/2019 | Dvorak | G06F 17/2282 |
| 2019/0125278 A1* | 5/2019 | Soosalu | A61B 5/0022 |

* cited by examiner

METHOD FOR DISPLAYING DATA ON A MOBILE TERMINAL

BACKGROUND OF THE INVENTION

The present invention relates to a method for displaying data on a mobile terminal.

From the prior art, displaying data in different arrangements on a mobile terminal, such as for example on a smartphone or on a tablet, is known. A problem here consists in that although certain parameters, such as e.g. turnover in certain time periods, and the associated parameter values, i.e. the turnover figures in these time periods are displayable, detailed information about these turnover figures, however, is not readily displayable, e.g. with which products these were realized, in which regions the turnover was realized, how the turnover has changed in comparison to a prior-year period, etc. To retrieve this manner of further information, a new file must be opened, which is not only inconvenient, but connected with the further disadvantage that, to revert to the original view of the turnover data, the new file must be closed, and the first-opened file must be opened anew.

SUMMARY OF THE INVENTION

Thus, the object of the present invention is to provide a method by means of which the user can quickly, and with little effort, get further information about certain parameters, which are of interest to the user, on a mobile terminal.

This object is achieved through a method with the features herein.

According thereto, it is provided that the method includes the following steps:
 a) access to a database, and display of one or multiple first parameters and one or multiple associated first parameter values on the screen of the mobile terminal,
 b) wherein the first parameters and the first parameter values are displayed in one or multiple first data fields in a first screen view on the screen,
 c) wherein the screen of the mobile terminal is a touchscreen, and
 d) wherein a touching of the touchscreen by a user leads to a change of the first screen view to a second screen view, wherein the first data field is converted into a second data field, which is displayed in place of or in addition to the first data field(s), wherein the at least one second data field includes one or multiple second parameters and/or one or multiple second parameter values, wherein the second parameters correlate with the first parameters, and wherein the second parameter values correlate with the first parameter values.

One or multiple first parameters and the associated parameter values are thus displayed in one or multiple first data fields. The first parameter can, for example, be the turnover in a certain time period, and the parameter value can be the size of the turnover, can i.e. be the numerical value of the turnover that was realized in the particular time period. These values can, for example, be displayed in a data field, e.g. in a row, column, or any other arrangement of a first screen view of the mobile terminal.

The data field can comprise any desired structure, size, arrangement, etc. It can be displayed as a row or column of a table, or as a structure arranged in a tabular format, or also in any other desired arrangement. The term "data field" is thus not limited to a certain region on the screen, but it is rather to be generally understood that the parameter and the associated parameter value are displayed in a region of the screen.

The invention is naturally not limited to the parameter "turnover", but rather includes any parameters, such as e.g. price discount, profit, rebate, labor cost, margin, etc. These exemplarily-mentioned parameters and their values can likewise be displayed, in a first screen view, in multiple first data fields.

At this point, it is noted that the terms "first" and "second" stand as representative for any desired value n and n+1, wherein n stands for an integer with n>1. This means that the invention is likewise applicable for the conversion, for example, of a third screen view into a fourth screen view, etc. All of the features of the disclosure of this invention thus apply generally for $n^{th}$ and $n+1^{th}$ . . . screen views, data fields, parameters, parameter values, etc.

Preferably, in this first screen view, first parameters are displayed, which stand in a relation to each other, such as e.g. the turnover realized within a certain time period and the profit realized within the same time period, the labor and material costs expended within the same time period, etc.

If the user touches the touchscreen screen, the screen view changes starting from a first screen view to a second screen view.

In this second screen view, caused by the touching of the touchscreen, the at least one first data field is converted into at least one second data field. This second data field can be displayed alternatively or in addition to the first data field(s) in the second screen view. The second data field(s) include(s) one or multiple second parameters and/or one or multiple associated second parameter values, wherein the second parameters correlate with the first parameters, and/or wherein the second parameter values correlate with the first parameter values.

An example to be mentioned is that in a first data field, the turnover is shown as a parameter and the turnover value is shown as a parameter value, e.g. for a particular time period. If this data field is touched by a user, e.g. via tapping of the touchscreen, at least one second data field is displayed in a second screen view, which replaces the first screen view.

The second data field(s) can, for example, include the total turnover, shown in the first screen view, split up into individual regions, e.g. turnover-north, turnover-south, turnover-east, and turnover-west, and the associated turnover values for these regions, and be displayed in a second screen view.

The parameter values can, in principle, be displayed as absolute values and/or as percentage values or as relative values, as ratios, as changes (absolute or as a percentage), etc.

A display format is conceivable, in which the absolute values or alternatively, i.e. in a different screen view, relative or percentage values are displayed, as well as a display format, in which absolute values as well as also relative or percentage values are displayed in a common screen view. As an example, the absolute value of a turnover in a certain time period as well as simultaneously its change (as an absolute value, or as a percentage) in comparison with a reference time period, such as e.g. the prior-year period, can be shown in a common screen view.

It is also conceivable that the user has the opportunity, via a touching of the touchscreen, to bring about a switch between absolute values and relative values, such as e.g. percentage values.

If changes are displayed relative to a reference value, e.g. as absolute values or percentage values, it is preferably provided that these changes are always shown with a sign which indicates if, relative to a reference value, such as e.g. relative to a prior-year period, an increase or decrease is present.

Here, the touched first data field can continue to be displayed, which, for the user, makes the allocation of the partial turnover or the like shown in the second screen view easier, or improves the clarity of the second screen view.

If, for example, the parameter turnover south region is touched in a screen view, a further screen view can be generated, in which the south region is subdivided into sub-regions, such as e.g. cities or counties, and is displayed with the parameter values respectively realized there. Here, it is an advantage if the touched data field—in this case, "south region", and/or the associated parameter value are still shown, in order that it is clear to the user which value or which region was subdivided into partial values or sub-regions.

As already explained above, in a preferred embodiment of the invention, this approach can be maintained so that, for example, the touching of a second data field in the second screen view leads to the generation of a third screen view, in which the touched second data field is further subdivided, and one or multiple third screen views are thus generated.

If one stays with the above-mentioned example, the user can, e.g. through touch of the data field "turnover south region", generate a third screen view, in which the parameter "turnover south region" is sub-divided into a multitude of third parameters, such as e.g. cities or counties, which are located in the south region. The third parameters, in this example, are therefore the cities, and the third parameter values are the turnover realized there.

This subdivision can be freely pursued further, so that e.g. the turnover in municipalities, etc., can be displayed, so that the invention is not limited to the conversion from a first screen view into a second screen view, but rather includes any number of further sub-divisions into further, i.e. third, fourth, etc., screen views.

It is also possible that, in touching the screen, not always the same second or subsequent screen view does follow a first or other screen view. In this way, which subsequent screen view the touching of the screen leads to can, for example, be dependent upon the type of touch.

Naturally, the above embodiments are only examples, which do not limit the invention.

In place of the turnover, any other desired parameters are also conceivable.

In place of the sub-division into regions, any other sub-division are conceivable, such as e.g. sub-dividing into products or product groups, by which the turnover in question was realized.

The parameter values can be absolute values, or deviations from a reference value, such as e.g. changes in relation to a prior-year period.

E.g. a turnover value, e.g. 6.5 Mio. would be conceivable, the indication of a change, such as e.g. a 16.5% increase of the turnover in comparison with a prior-year period, would likewise be conceivable.

Both parameter values can also be indicatable, i.e. one or multiple absolute values, und one or multiple changes in comparison to a reference value.

As exemplified above, the first parameters can be sub-dividable into subgroups, with the subgroups forming the second parameters. As explained above, it is conceivable that the first parameter forms the turnover, and the second parameters correlating therewith form the turnover per region, or per product, or per sales representative, etc.

The same applies to the parameter values, which, preferably, are displayed as absolute values or deviations from a reference value. Just like the parameters, the parameters can likewise be sub-divided.

If, for example, the first parameter value represents the total turnover, the second parameter values may represent e.g. the turnover values realized by the second parameters, i.e. the turnover for different regions, products, or sales representatives, etc.

Touching of the touchscreen can, e.g., consist of a tapping on the screen or of a swiping movement over the screen, or of a combination out of both of the aforementioned touches, or as well of any other type of touching the screen.

It is conceivable here that the second screen view, respectively the screen view that follows a touch, depends upon which touch the user made.

Thus, e.g. a tapping on a data field or on the screen can lead to a screen view other than that when swiping over the data field or the screen. Just as well, the direction and/or speed of the swiping over the screen may lead to different data fields or screen views dependent upon the swiping direction or swiping movement.

Thus, it is conceivable, e.g., that the user can decide, by the type of touch, which second or further screen view is being generated.

This also includes the direction in which the user carries out the swiping movement and/or how many times the user taps on the screen, etc.

A swiping movement to the right can, e.g., lead to a sub-dividing of the total turnover, i.e. a first parameter, into regions, whereas a swiping movement to the left may, e.g. lead to a sub-dividing of the total turnover, i.e. a first parameter, into products, wherein in the first case, the regions form the second parameters and the turnover realized there forms the second parameter values, and in the second case, the products form the second parameters and the turnover realized therewith form the second parameter values.

A tapping may lead to, e.g., a sub-dividing of the total turnover into second data fields, which show the total turnover subdivided into regions, for example. A swiping over the first data field can lead, e.g., to the displaying of second data fields, which include the total turnover subdivided into products, etc.

Preferably, multiple first data fields and/or multiple second data fields are displayed on the screen. Examples are multiple first data fields, among which for example one includes the turnover, another one includes the profit, another one includes rebates, as well as the respectively-associated parameter values.

Now, the user can decide on which parameter he or she wishes further information, and have this information be displayed in a second screen view generated then.

Thus, the user may press the data field "rebates" and obtains a second screen view, in which the overall-granted rebates are displayed subdivided into sub-rebates by regions, related to products, etc.

The same applies to other first data fields, such as the profit, turnover, etc.

It is conceivable that multiple first fields are displayed on the screen and that one, multiple of all of the first data fields are converted into second data fields, which are displayed on the screen alternatively or in addition to the first data fields, by the touch of the screen or of a first data field.

Thus, it is possible that only the touched first data filed is converted into a second data field, whereas all or some of the other first data fields remain unchanged, or are not shown at all in the second screen view.

It is likewise possible that all or multiple of the first data fields are converted to second data fields, which are then shown in the second screen view, by a touch of one single first data field or of the screen.

It is conceivable that the first data fields, which are converted into the second data fields by a touch, are selectable by a user and/or depend upon the type and/or the size of the parameters and/or of the parameter values. In this way, the user himself/herself can decide which touch of the touchscreen leads to which second screen view.

It is also conceivable that in a touch of the touchscreen, which shows the first screen view, only the parameter(s) that has/have a certain characteristic, e.g. the greatest deviation from a reference value such as a value of the previous year, the representation of the parameter values as percentage values or as absolute values, etc. is/are converted into a second data field, i.e. are sub-divided further.

It is also conceivable, e.g., that multiple first data fields are present in the first screen view, which e.g. respectively show the turnover and the turnover value in a certain region. If the user swipes over the screen or touches it otherwise, it is conceivable that only for the highest or lowest turnover, or for the turnover having the greatest or smallest change, a second screen view is generated, which subdivides the turnover in question into one or multiple second parameters.

In another embodiment of the invention, it is provided that, when being touched, only the first data fields are converted into the second data fields which comprise the same structure in at least one respect. It is conceivable that only the first data fields are converted into second data fields, which, e.g. show the total turnover and the associated turnover value and, if required, a percental change compared to the previous year. In a touching of the screen, only those first data fields which e.g. also show the turnover per region etc. and the respectively associated turnover value and possibly a percental deviation from the previous year are converted into second data fields. Other data fields of the first screen view that have a different structure, e.g. the number of followers in a certain time period, are displayed in the same manner as before, or omitted.

The change of only certain data fields of the first view into a second screen view can also relate to whether the data fields of the first screen view correlate by content. Turnover, costs and profit correlate with each other by content, i.e. depend upon each other. Thus, it is conceivable, when touching the screen, that only those data fields correlated by content are converted into second data fields of the second screen view, but other data fields of the first screen view are not. These can be kept unchanged in the second screen view or be omitted.

It is also conceivable that in the case of a shift of the data of data fields by a corresponding swiping movement on the screen does not result in a new screen view. This is the case if no further view is linked with the movement. In this case, it is possible that the shift on the screen is actually performed as far as to a boundary line, but the shifted data, words etc. return to their original position after being released, i.e. the first screen view is maintained. This can be signalized to the user in a haptic manner, e.g. by a short vibration of the mobile terminal.

However, the invention also includes a change of the structure. Thus, absolute values can be displayed in the first screen view, and relative values, e.g. deviations from a prior-year value etc., can be displayed in the second screen view, or vice versa, for example.

The structure of the data field(s) can, e.g., consist in that the parameter values are present in the form of absolute values or in the form of deviations, in the form of spark lines, diagrams, etc.

It is conceivable that the type of touch has an influence on the type of the second parameters and/or the type of the second parameter values. Thus, a tapping of the screen can result in that e.g. the total turnover (=first parameter) and its value (=first parameter value) is converted into a turnover per region (=second parameter) and into the turnover respectively realized there (=second parameter value).

By contrast, a swiping over the screen can e.g. result in that the total turnover (=first parameter) and its value (=first parameter value) is converted into a turnover per product (=second parameter) and into the turnover respectively realized with this product (=second parameter value).

The type of the touch can e.g. concern the intensity and/or the number of tapping on the screen.

Alternatively or additionally, the type of touch can be the direction and/or speed with which a swiping movement is carried out on the screen.

As already exemplified above, it can be provided that a first touch of the screen leads to a conversion of the first data field into a second data field, and that a second touch of the second data field in the second screen view leads to a displaying of a third data field which includes parameters and parameter values which correlate with the ones of the second data field. This continuation is conceivable in any sub-division, so that the number of screen views and data fields that can be generated is not limited.

Furthermore, it is conceivable that a conversion of the first data field into a second data field leads to a re-grouping of the parameters and/or parameter values. Thus, it is conceivable that multiple first data fields are displayed in a first screen view, e.g. from top to bottom the turnovers north, south, east and west. If now, e.g., the data field with the turnover west is tapped or touched otherwise, this data field, which shows the subdivision of the turnover west, e.g. into turnover by product, can be displayed on top, and the further data fields, e.g. turnover north, south, and east can be displayed below.

Furthermore, it can be provided that the data fields, text, numbers or parts thereof are displayed in colors and/or sizes which depend upon at least one characteristic of the parameter or parameter values. Thus, profits can be displayed in blue and losses can be displayed in red, or displayed in correspondingly-colored data fields.

Furthermore, numerical values can be displayed with a font that is the bigger the higher the numerical values are. This typographical scaling can be proportional, i.e. there is a direct proportional relation between the value and the font size of the displayed value. Deviating representations are likewise conceivable and comprised by the invention. For example, a step-like scaling is conceivable, in which values below or above a threshold value are displayed in a certain (font) size, and numbers, the numerical value of which does not reach the threshold are displayed smaller or bigger. Thus, not a continuous scaling, but a step-like scaling is obtained.

Corresponding configurations may also apply to the color design. Thus, it is conceivable to have the color depth increased as the numerical value of the illustrated value increases, and, on the other hand, to have the color depth decreased the smaller the numerical value of the illustrated value. This can also occur directly proportional, step-like or with other scales related color.

It is conceivable that the text and/or the numbers and/or their background are per se displayed in colors, such as e.g. the data field.

Insofar numerical values are displayed, this can occur in that numbers are written out or provided with k or m, etc., i.e. not written in their entire length. Here, it is conceivable to provide a threshold value, possibly alterable by the user, up until which the numbers are still written out (e.g. numbers up to 9,999), and numbers with five digits or more are provided with the mentioned abbreviations such as k or m, or the like and are therefore displayed in a short version in regard to the numbers.

The database that the data is fetched from can be an Excel spreadsheet, for example. All of the data or part of the data of theses spreadsheets is used for the display on the touchscreen. Here, it can be provided that the selection occurs on the side of the user, or depends upon one or multiple characteristics of the parameters, such as their size, alteration, etc.

The change from the first to the second screen view can be effected in such a way that the second screen view depends on what exactly was touched in the first screen view.

If, for example, the turnover is displayed as the parameter as well as its numerical value and its percental change to the prior year as parameter values, the second screen view may depend upon whether the user touched the parameter per se, i.e. the term "turnover", or the absolute value or the percental change.

If the user touches the absolute value, for example, the second screen view may display absolute values again, possibly sub-divided into products, regions, etc. If the user touches the percental change, the second screen view can again show the percental change, possibly sub-divided into products, regions, etc.

As already explained above, the present invention is preferably not limited to the fact that exactly one second screen view is generated out of a first screen view. In principle, the second screen view can be converted into a third screen view by an anew touch.

If a text to be displayed, e.g. a product name, is too long for the field provided for it on the screen, it is conceivable to display only part of the text, i.e. only the text fitting in the field. By a touch of the field, in a preferred embodiment, the entire text is then displayed, either for a certain time period or for as long as the user touches the field.

Furthermore, the present invention relates to a computer readable storage medium and/or an app including commands, which when executed by a computer cause this computer to perform the method according to one of the invention. Preferably, this is a processor etc. capable of performing the method according to the invention.

Preferably, the method is implemented in the form of an app, which is per se installable or installed on a mobile terminal.

The present invention relates to a mobile terminal having a processor which is programmed to perform the method according to the invention and/or contains a storage medium according to the invention.

The database from which the data displayed in the method according to the invention is fetched might be stored on the mobile terminal. As an alternative, it can be provided that the data are transmitted from an external source, e.g. a server, preferably wireless, e.g. per mobile radio communication, to the mobile terminal.

At this point, it is noted that the term "a" does not necessarily refer to exactly one of the elements, even though this is one possible configuration, but can also refer to a multitude of the elements. Just as well, use of the plural includes the presence of the element in question in singular and, on the other hand, the singular also includes multiple of the elements in question.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further details and advantages of the invention are illustrated by an exemplary embodiment illustrated in the figures.

The figures show different screen views of a smartphone or a tablet, which are generated by a touch of the screen by a user in which.

DESCRIPTION OF THE PREFERRED EMBODIMENT

Figure 1:
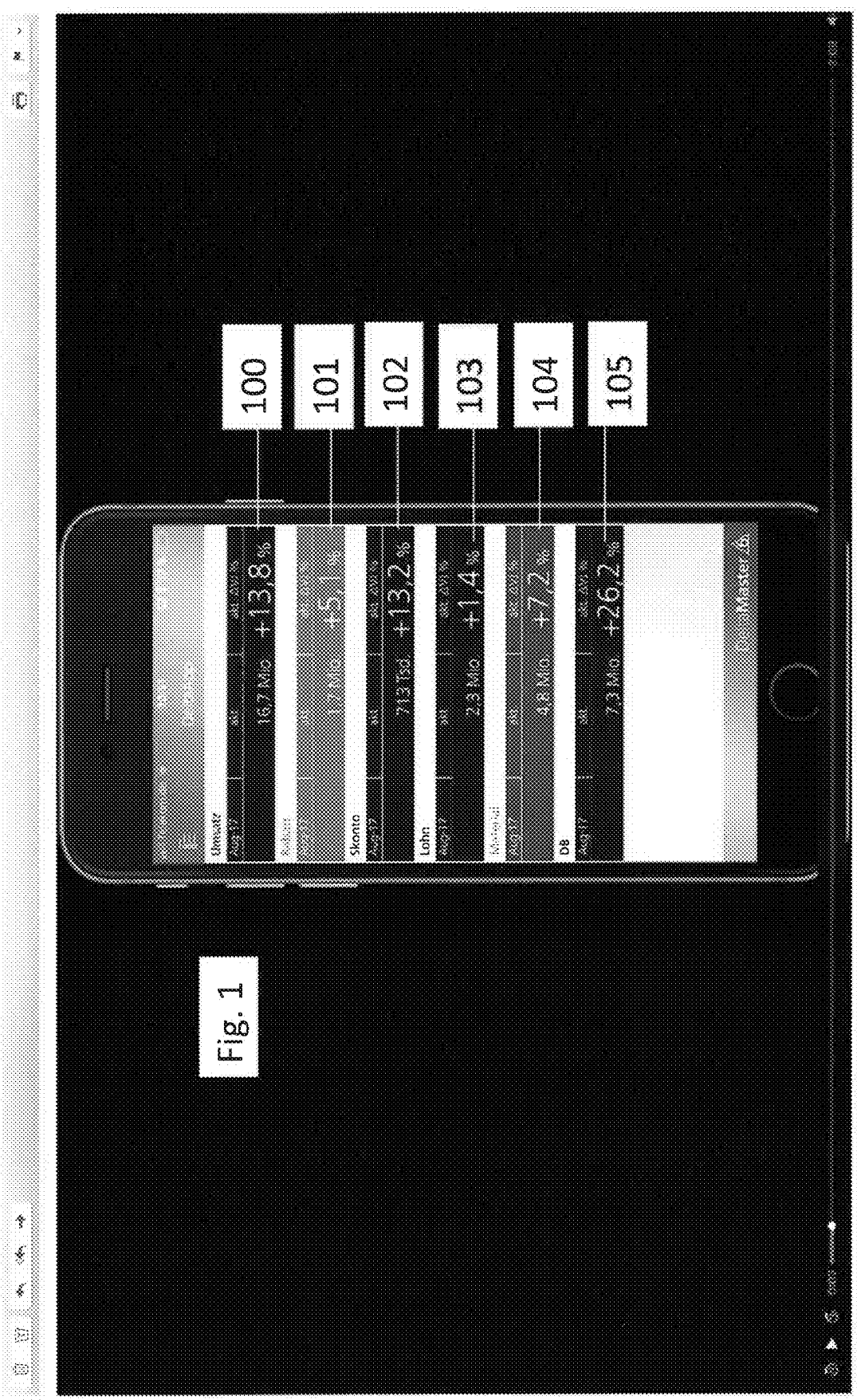
FIG. 1 shows a first screen view.

FIG. 1 shows a first screen view, in which a total of six data fields 100 to 105 are displayed.

Here, data field 100 shows the turnover for August 2017 as the first parameter and the turnover figure realized for this period as an absolute value and as a deviation compared to the prior-year period (August 2016) as the first parameter values.

A corresponding arrangement is present for the first data fields 101 to 105, which show the rebate (data field 101), discount (data field 102), labor costs (data field 103), material costs (data field 104), and margin DB (data field 105). These each represent the first parameters and the values shown in the same line, i.e. in the same data field, represent the associated first parameter values.

All parameter values are shown for the same period, in this case August 2017 in an exemplary manner.

All data fields are in blue color, the font color inside the fields is white. The blue coloration emphasizes that increases were generated in all data fields.

Figure 2:
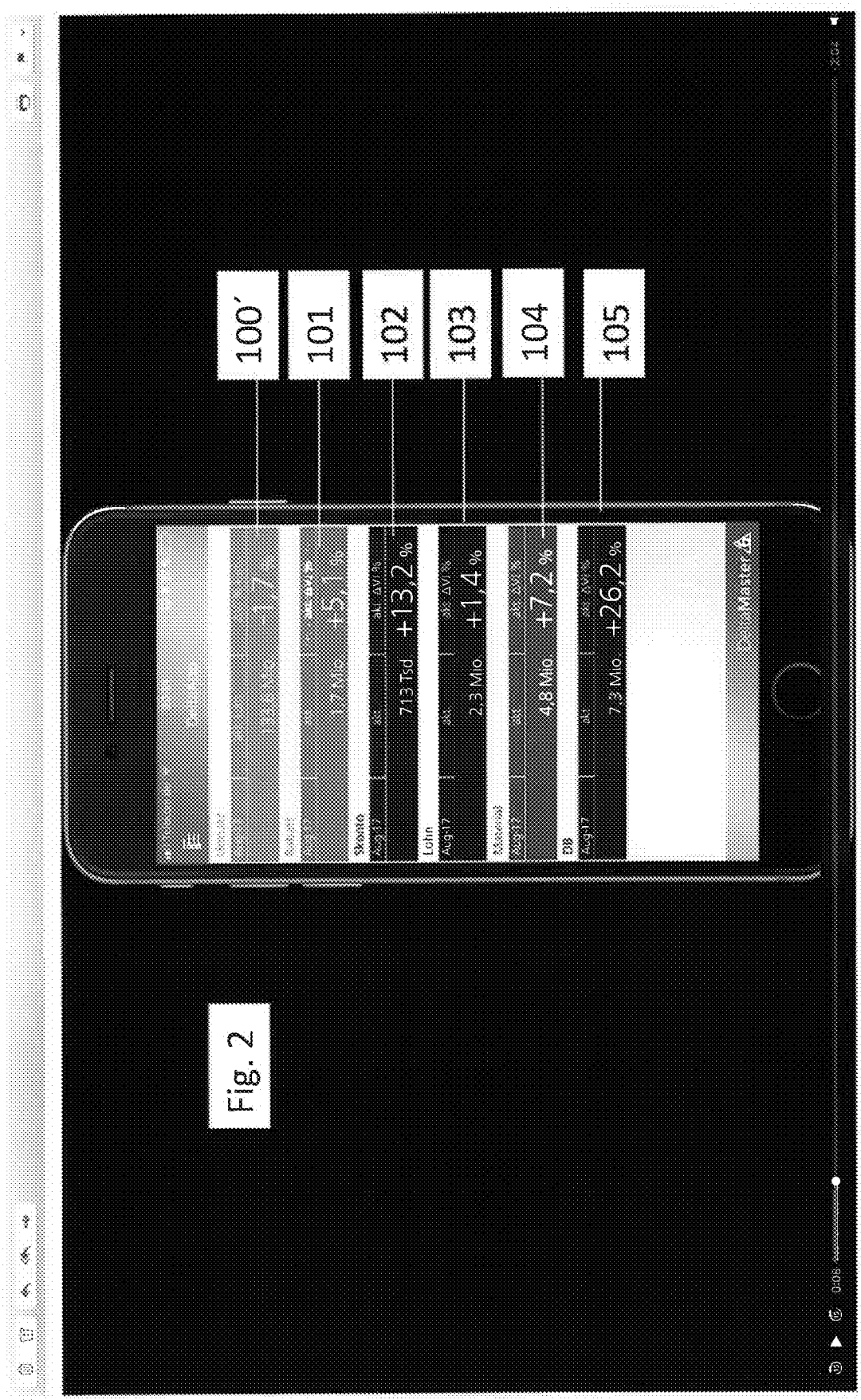
FIG. 2 shows a second screen view obtained from the first screen view.

FIG. 2 shows a further, second screen view, which was obtained from the first screen view in that the user moved the field 100 to the right or left by a swiping movement to the right or to the left.

This results in that the data field 100' is generated from the data field 100, in which not the turnover (=first parameter) for the month of August 2017 is displayed, but the accumulated turnover (=second parameter) in 2017 from January to August 2017.

Because the user only touched or relocated the field 100, the further data fields 101 to 105 of the first screen view remain unchanged and are displayed in the second screen view in FIG. 2.

As the cumulated turnover of the field 100' decreased compared to the prior-year period (January to August 2016), the second data field 100' in FIG. 2 is represented in red color, with a white font.

Figure 3:
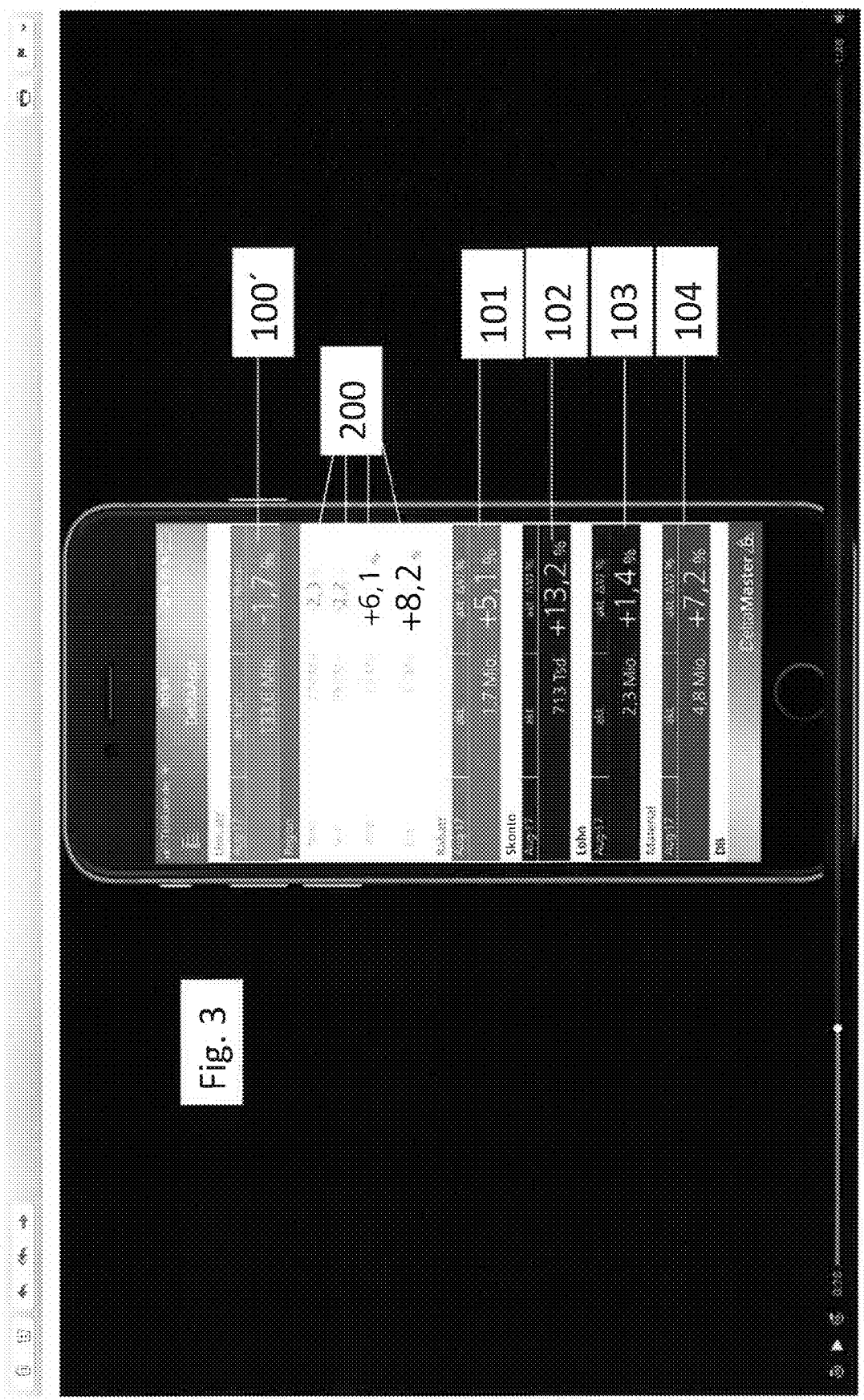
FIG. 3 shows a second data field and sub-division into third parameters.

If the user wants to know, based upon the second screen view in FIG. 2, how the negative turnover development is composed, the user taps on the second data field 100', so that the third screen view according to FIG. 3 is displayed.

FIG. 3 still shows the second data field 100', and below it, its sub-division into third parameters, i.e. the cumulated turnover for the regions north, south, west and east (=third parameters), and the absolute values for these regions and the changes of the turnover for these regions relative to the prior-year period, i.e. the third parameter values, are respectively shown next to them. These third data fields are together indicated by the reference character 200.

Here, the font size of the numerical values of the turnover increases as the change in turnover increases. Apart from that, positive changes are shown in blue font and negative changes are shown in red font.

The further first data fields 101 to 104 are shifted downwards. There is not enough space for the last data field 105, so that this data field is not displayed anymore.

However, if can be displayed in that the user makes an upward swiping movement over the screen.

Now, the user is interested in why there is a negative development in turnover in the region south, and taps on the third data field 200, in which this region is listed.

Figure 4:
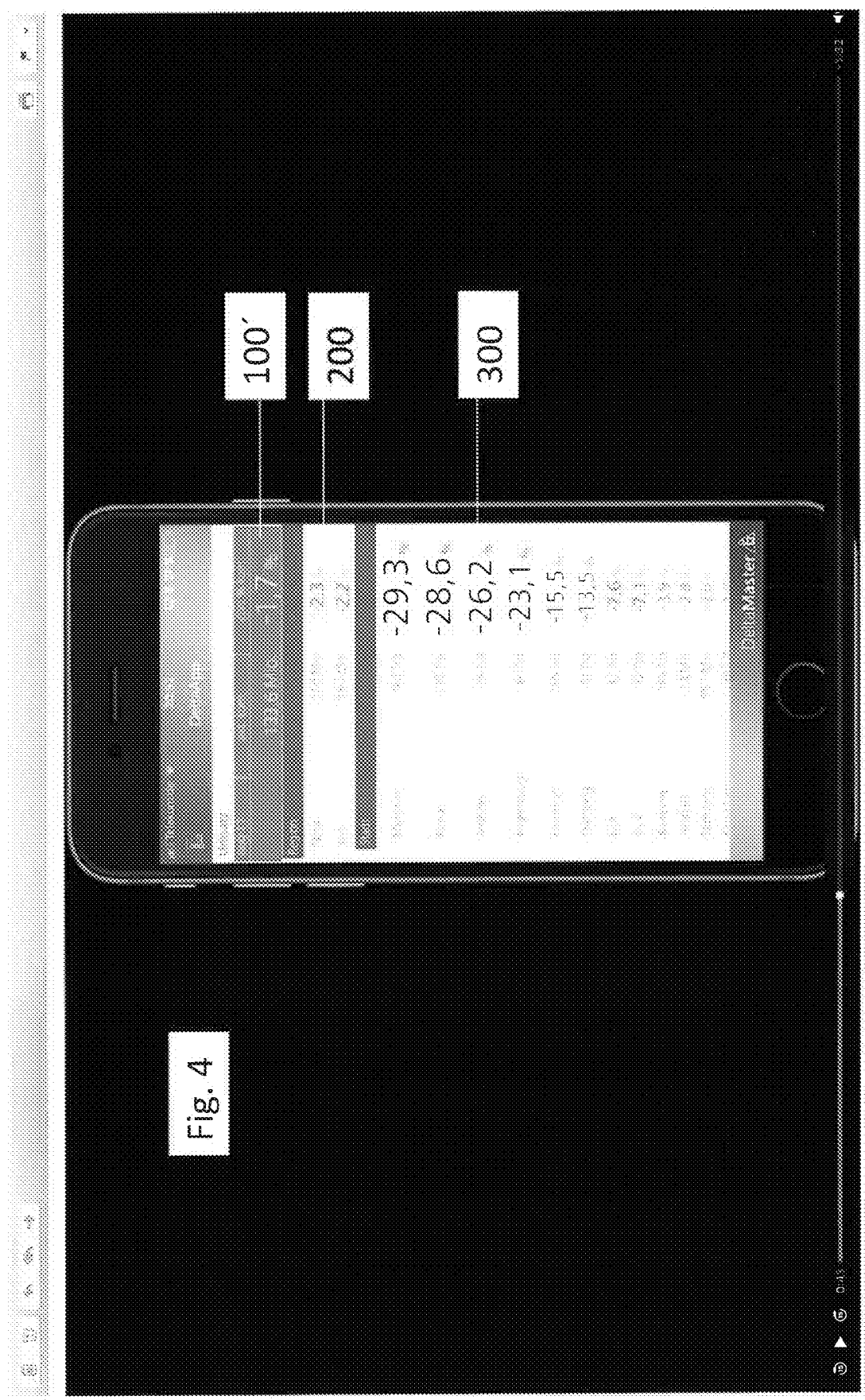
FIG. 4 shows a fourth screen view with fourth parameters.

The user now obtains the fourth screen view of FIG. 4. In this view, the cities of the region south are shown as fourth parameters, and the absolute values of the turnover for these cities and the changes of the turnover for these cities relative to the prior-year period are shown as the fourth parameter values.

Here, the cities are listed by the change in turnover, i.e. the bigger the change the farther on top the city is listed. The same applies to the size of the displayed value of change as well as to the color and color depth.

The third data field, in this case "region south" is still displayed above the list of the fourth parameters, so that it is immediately discernable the cities of which region are displayed.

If the user makes, based upon FIG. 4, a swiping movement to the right or to the left, an anew sub-division of the region south will be displayed, but this time not subdivided into cities as the fourth parameter, but sub-divided into fifth parameters, in this case into product groups of the region south.

The unchanged data fields 200, 101 and 102 are still located above and below it.

Figure 5:
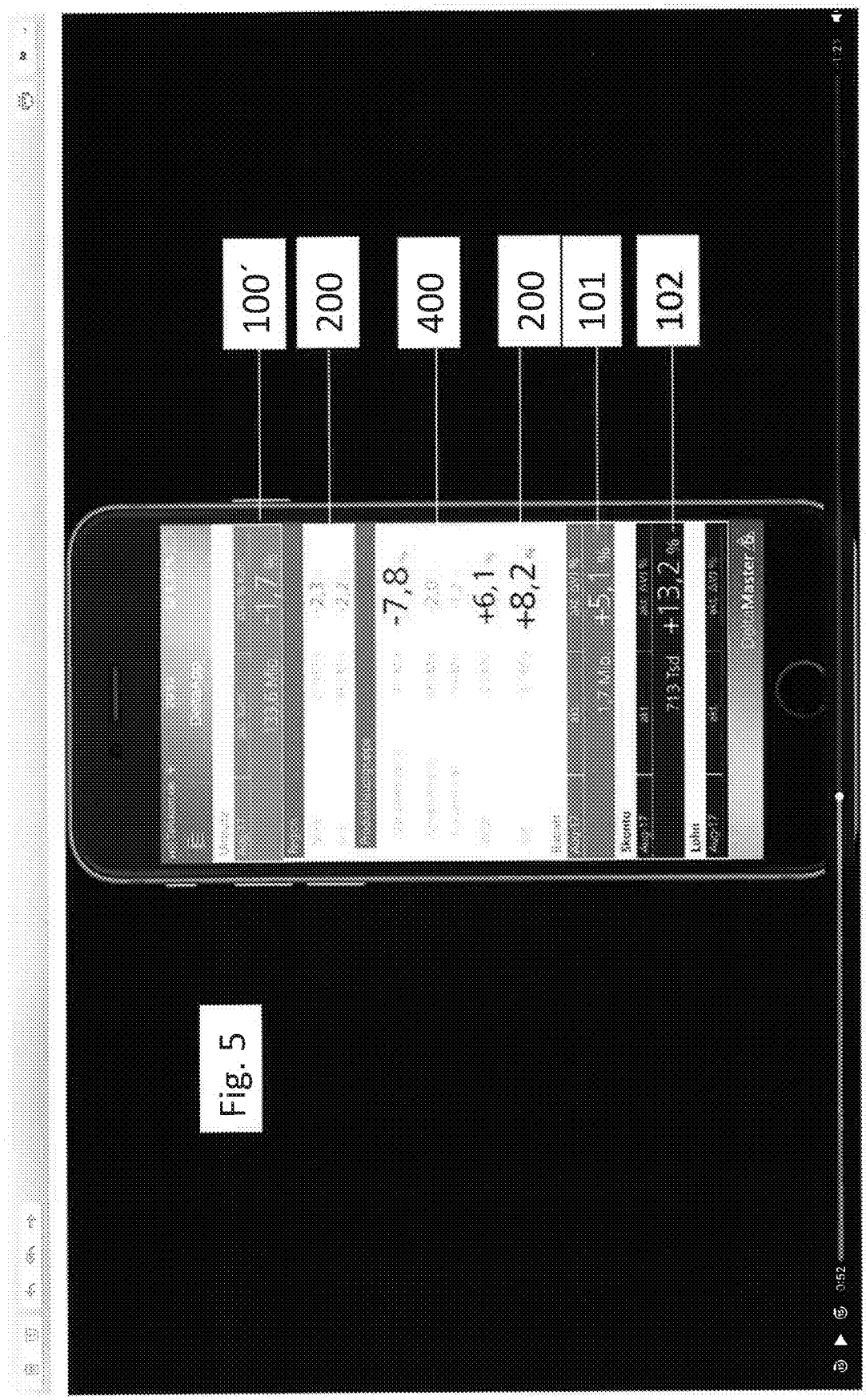
FIG. 5 shows a fifth screen view obtained from the fourth screen view.
Figure 6:
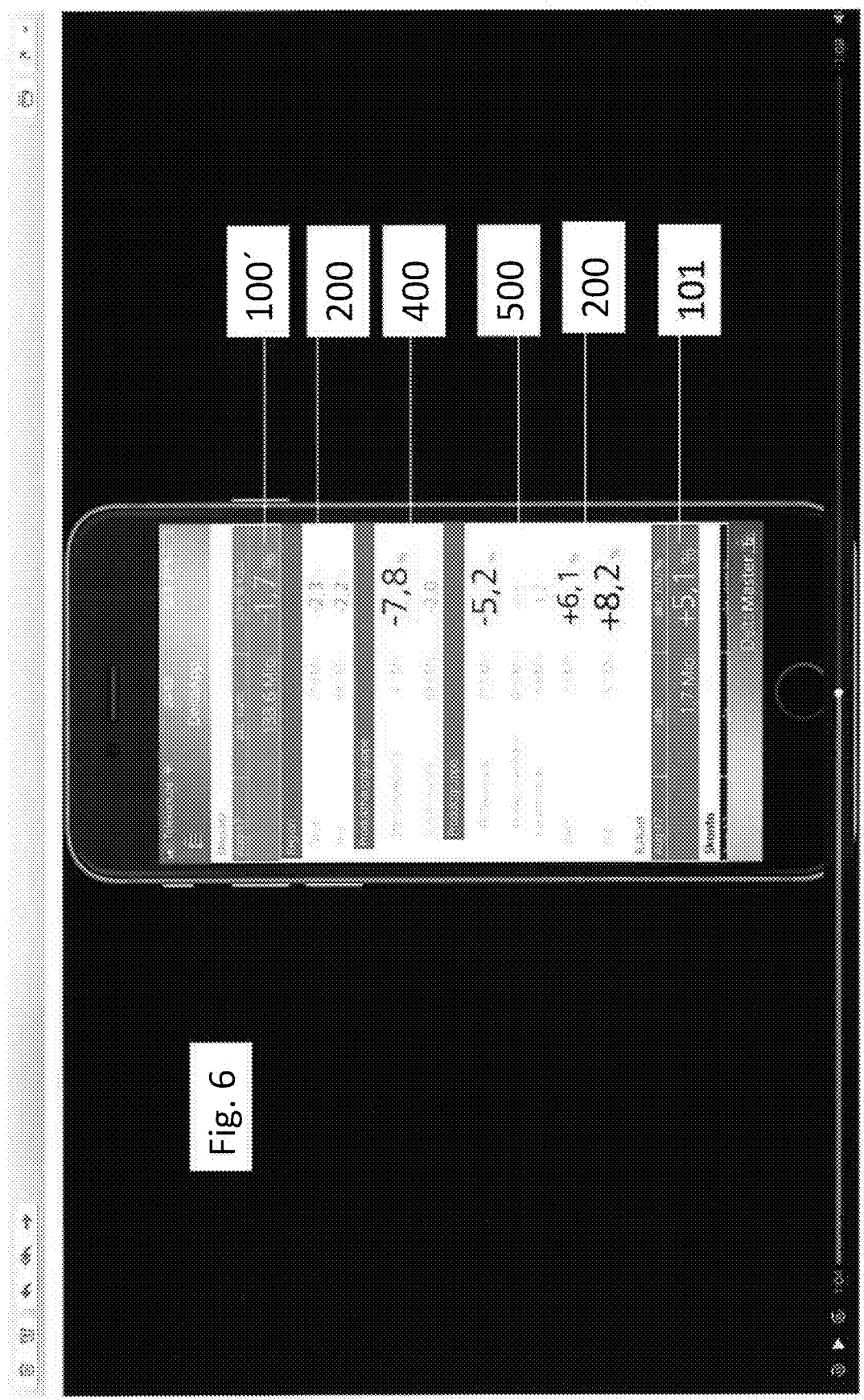
FIG. 6 shows a sixth screen view obtained from the fifth screen view.

If the user is interested, based upon the view of FIG. 5, in how the turnover in model group "special models" developed, the user taps on the data field containing the term "special models" and obtains the view of FIG. 6.

The parameter "special models" is subdivided there into three sixth parameters and the associated sixth parameter values (see data fields 500), while the further data fields not touched in FIG. 5 did not undergo any changes compared to the view of FIG. 5.

It is to be noted that a swiping movement can be carried out instead of a tapping movement, or vice versa, in the exemplary embodiment and generally according to the invention.

The invention claimed is:

1. A method for displaying data on a mobile terminal, comprising the steps of:
   a) accessing a database and displaying one or more first parameters and one or more associated first parameter values in a first screen view on a touch screen of the mobile terminal;
   b) displaying the first parameters and the first parameter values in one or more first data fields on the touch screen; and
   c) touching the touchscreen to change the first screen view to a second screen view, in which one or more second data fields are displayed, including at least one of one or more second parameters and one or more second parameter values, the second parameters correlating with the first parameters, and the second parameter values correlating with the first parameter values, wherein
   the screen views are changed depending upon at least one of strength of taps on the touch screen, number of taps on the touch screen, direction of swiping movement along the touch screen and speed of swiping movement along the touch screen,
   swiping an area of the first screen view of the touch screen replaces previously-displayed data of the first screen view at that particular location of the screen with new data of the second screen view and with the other previously-displayed data of the first screen view remaining unchanged, and
   tapping an area of the second screen view of the touch screen results in a third screen view of new data being displayed below the previously-displayed data of the second screen view at that particular location, and with the other previously-displayed data of the first screen view shifting on the screen,
   wherein multiple first data fields are displayed on the screen in the first screen view, and one or more first data fields are converted into second data fields by swiping the screen at that particular location, and without changing the other data presently-displayed upon the screen,
   displaying the data of the first and second screen views with a red background color, a blue background color, or a white background color and a red color font, a blue color font, or a white color font, with the red color font or the blue color font displayed within the white background, or the white color font displayed within the red background or the blue background,
   wherein swiping the blue background changes to the red background in the second screen view, and tapping the red background results in the data displayed below the red background in the second screen view with the red color font or the blue color font displayed within the white background in the third screen view.

2. The method according to claim 1, wherein at least one of the first parameters are divided into subgroups forming the second parameters, and the first parameter values are divided into subgroups forming the second parameter values.

3. The method according to claim 1, wherein, on the screen, at least one of multiple first data fields are displayed in the first screen view, and multiple second data fields are displayed in the second screen view.

4. The method according to claim 1, wherein the first data fields, which are converted into the second data fields by touch, are at least one of selectable by a user, and depend upon at least one of type or size of the parameters and type or size of the parameter values.

5. The method according to claim 1, wherein the first data fields, when being touched, are converted into the second data fields, which comprise the same structure.

6. The method according to claim 1, wherein the touch influences at least one of the second parameters and second parameter values.

7. The method according to claim 1, wherein a conversion of the first data field into a second data field re-groups at least one of the parameters and the parameter values.

8. The method according to claim 1, wherein the data fields or parts thereof, or text or numbers are displayed in colors which depend upon at least one characteristic of the parameters or the parameter values.

9. The method according to claim 1, wherein at least one of the first and second data fields correspondingly apply to any $n^{th}$, and $n+1^{th}$ data fields generated therefrom by touching the screen.

10. The method according to claim 1, wherein the database is a spreadsheet.

11. A mobile terminal with a processor which is programmed to carry out the method according to claim 1.

12. The mobile terminal according to claim 11, wherein the database is stored on the mobile terminal.

13. The mobile terminal according to claim 11, containing a storage medium.

14. The mobile terminal according to claim 11, containing a computer program product including commands which, when executed by a computer, causes the computer to execute the method.

15. The mobile terminal according to claim 14, wherein the computer program product is an application.

16. The method according to claim 1, wherein the new data displayed in the third screen view is displayed with varying font size.

17. The method according to claim 1, wherein peripherally-displayed data in the second screen view disappears in the third screen view.

* * * * *